United States Patent [19]

Fagre, Jr.

[11] 4,285,110
[45] Aug. 25, 1981

[54] PALLET DISASSEMBLING DEVICE

[75] Inventor: Raymond C. Fagre, Jr., Minneapolis, Minn.

[73] Assignee: Pallet Service Corporation, Minneapolis, Minn.

[21] Appl. No.: 43,507

[22] Filed: May 29, 1979

[51] Int. Cl.³ .................................... B23P 19/04
[52] U.S. Cl. ............................................ 29/252
[58] Field of Search ..................... 29/252, 244, 239

[56] References Cited

U.S. PATENT DOCUMENTS

| | | | |
|---|---|---|---|
| 3,512,242 | 5/1970 | Harris | 29/252 |
| 3,740,815 | 6/1973 | Campbell et al. | 29/252 |
| 3,822,861 | 7/1974 | Scott . | |
| 3,846,890 | 11/1974 | Bielkiewicz . | |
| 3,869,783 | 3/1975 | Spencer . | |
| 3,875,643 | 4/1975 | Cramer . | |
| 3,899,816 | 8/1975 | Jennings . | |
| 3,916,498 | 11/1975 | Lopez et al. . | |
| 3,991,459 | 11/1976 | Rapp . | |
| 4,089,098 | 5/1978 | DeMarco | 29/239 |
| 4,112,578 | 9/1978 | Sanford | 29/252 |

Primary Examiner—James L. Jones, Jr.
Attorney, Agent, or Firm—Merchant, Gould, Smith, Edell, Welter & Schmidt

[57] ABSTRACT

Apparatus is provided for disassembling a wooden pallet having a plurality of longitudinal stringers and a plurality of transverse slats which are nailed or otherwise secured to the stringer edges to define top and bottom planar support surfaces. The apparatus includes a table defining a support surface for the pallet and a slat removing device pivotally carried by the table and disposed relative to the support surface to receive one of the end slats of the pallet. The slat removing device moves in an arc between the first position in which the pallet end slat is received and a second position in which the slat is removed from the stringers. Hydraulic actuators serve to move the slat removing device between the first and second positions. Apparatus are provided for retaining the pallet as the slat is removed. In a first embodiment, the slat removing device receives an upper end slat of the pallet and removes it by upward arcuate movement. In a second embodiment, a lower end slat of the pallet is received by the slat removing device, which pivots downward to remove the slat.

27 Claims, 9 Drawing Figures

PALLET DISASSEMBLING DEVICE

The invention is related to apparatus for disassembling wooden pallets, and is specifically directed to apparatus which removes the damaged end slats of a pallet.

Wooden pallets are commonly used for storing and carrying various articles. The wooden pallet typically comprises a plurality of longitudinal stringers which are disposed on edge in parallel, spaced relation. A plurality of transverse slats are nailed or otherwise secured to the upper and lower edges of the stringers to define top and bottom supporting surfaces.

Pallets are generally fabricated from lesser expensive hardwoods, which wear reasonably well. However, the two end slats on both the top and bottom support surfaces are frequently damaged by heavy products which overlie the support surfaces, or by the tines of the forklift. Because the cost of manufacturing new pallets is relatively high, it is preferable to repair the old pallet by removing and replacing the damaged slat or slats. Generally, the other components of the pallet are not as severely damaged, and repair of the pallet in this manner permits it to be used for a considerably longer period of time. Removal of the slats from the stringers is generally difficult because the pallets are large and unwieldy, coupled with the nail retaining capability of hardwood. Breakage of the slat also may compound difficulty of the task. Broken or worn slats are often removed by hand with the use of a claw hammer or crowbar, but this is a time consuming and laborious job.

Prior art apparatus directed to pallet disassembly are generally quite complex and contemplate the simultaneous removal of a plurality of slats from the pallet stringers. The fact that total slat removal is not a necessity in many cases, coupled with the cost of such a machine, severely limits its application.

Single slat removing devices are known in the prior art, but they are either portable and somewhat difficult to use, and/or incapable of removing the entire slat simultaneously. Further, many of these devices require a number of manual manipulative steps in order to position the pallet for removal of the slat.

The subject invention is therefore the result of an endeavor to solve a recognized problem by providing apparatus capable of removing a single end slat from a pallet in a simple, efficient manner. The inventive apparatus comprises a table defining a horizontal support surface upon which the pallet is placed by the operator. Slat removing means are pivotally carried by the table, preferably along its rearward edge, and disposed relative to the support surface so that in a first position it receives one of the end slats of the pallet. The slat removing means is movable through an arc, about its pivot axis, between the first slat receiving position and the second position in which the slat can be removed from the stringers. This arcuate movement is effected by actuating means which in the preferred embodiment comprises a hydraulic circuit with hydraulic actuators. Means are provided for retaining the pallet as the slat removing means moves from the first position to the second position.

In a first preferred embodiment, slat removing means comprises a horizontal carrier beam disposed rearwardly of the support surface. A plurality of finger members are secured to the beam in pairs, projecting forwardly in cantilevered fashion. The fingers of each pair are spaced apart a distance greater than the thickness of a pallet slat, thus permitting one of the end slats on the top surface of the pallet to be received between the finger pairs. The carrier beam is moved arcuately upward, with the fingers moving from their initial horizontal position to the second slat removing position in which they point vertically downward, thus releasing the removed slat.

In a second preferred embodiment, the slat removing means also comprises a horizontal carrier beam disposed rearwardly of the support surface and journaled between rearwardly extending table sides. A longitudinal plate is secured on edge to the beam, projecting forwardly toward the support surface in coplanar relation. Thus, with the slat removing means in its first position, the pallet slides over the support surface with its leading lower edge supported by the longitudinal plate.

The slat removing means further comprises a plurality of fingers secured to the beam and projecting forwardly in spaced relation to the longitudinal plate. Thus, the lower end slat of the pallet is received by the slat removing means, and is removed as the fingers and plate move arcuately downward. In this second position, the slat is released for disposal.

The inventive apparatus is simply and easily operable by a single person, and requires minimal maneuvering of the pallet on the support surface, which carries the pallet weight. With the pallet in the slat removing position, the operator simply actuates the hydraulic circuit, and the slat is automatically removed.

Additional features and advantages of the inventive apparatus will become apparent from the detailed description and drawings.

DESCRIPTION OF THE PREFERRED EMBODIMENTS

Figure 4:
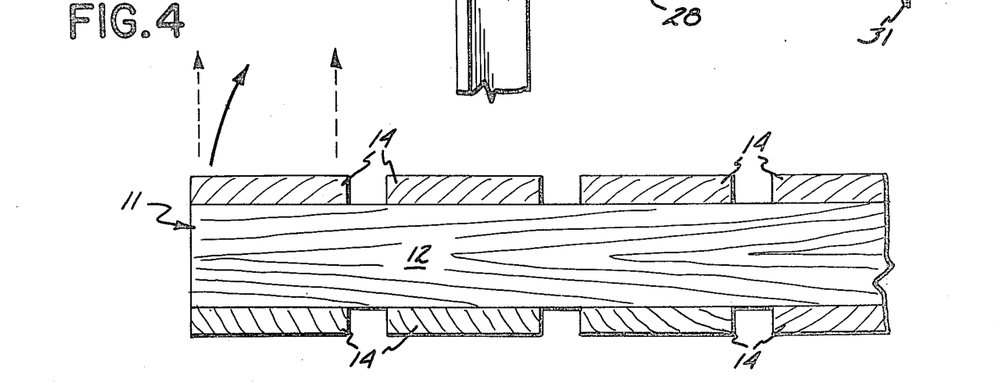
FIG. 4 is a fragmentary side view of a pallet, showing the direction of movement of one of the pallet slats during removal or disassembly.
Figure 5:
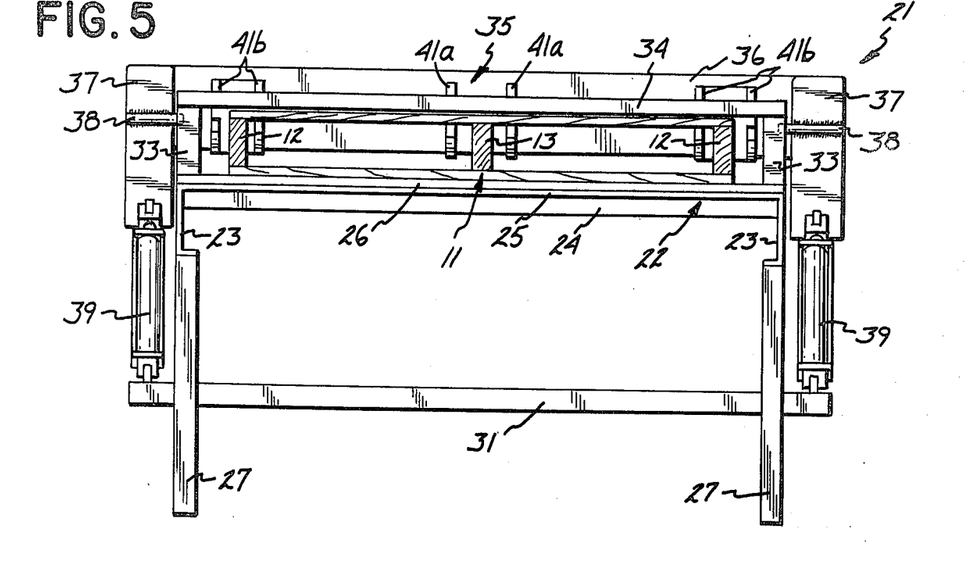
FIG. 5 is a view in front elevation of the disassembling apparatus with a pallet in disassembly position.

With brief initial reference to FIGS. 4 and 5, a conventional wooden pallet is represented generally by the numeral 11. Pallet 11 is formed from two longitudinal side stringers 12 and a middle stringer 13 which are disposed on edge in parallel, spaced relation, and a plurality of transverse slats 14 which are nailed to the top and bottom edges of the stringers 12, 13. The slats 14 are also disposed in spaced, parallel relation along the top and bottom stringer edges, and the slat faces thus defined upper and lower planar support surfaces.

The dimensions of pallet 11 are not critical, although there is some degree of uniformity in order that the lifting tines of a forklift may be inserted into the longitudinal spaces between stringers 12, 13.

Figure 1:
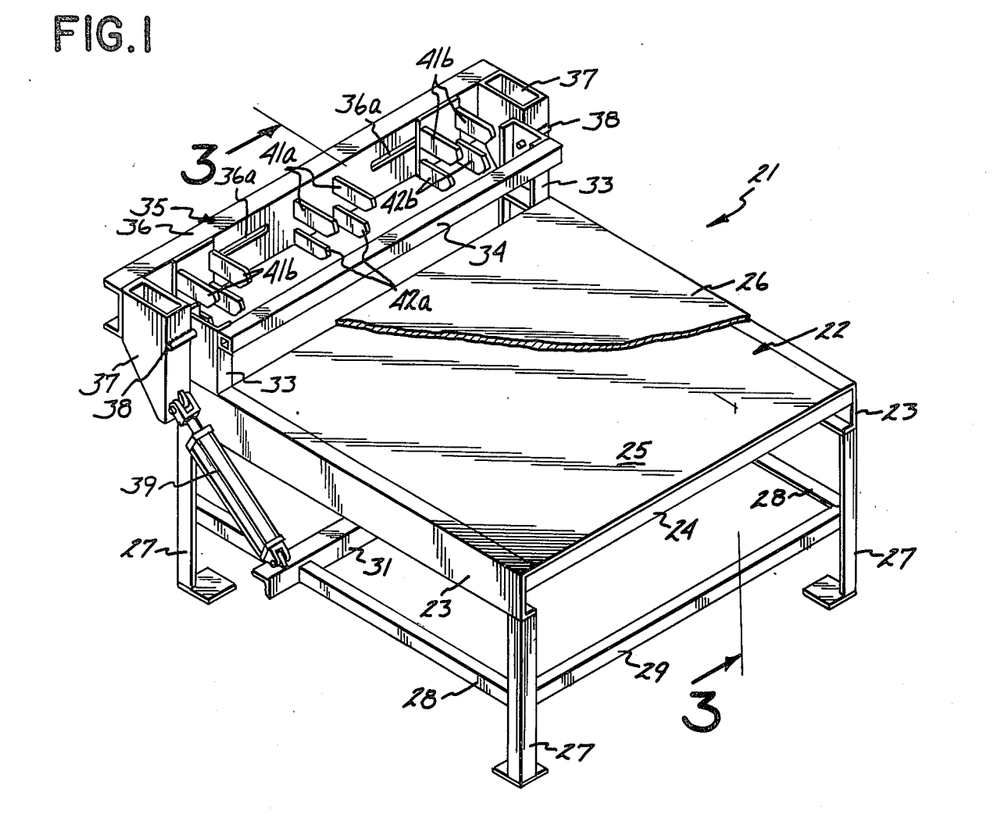
FIG. 1 is a perspective view of pallet disassembling apparatus according to the present invention.
Figure 3:
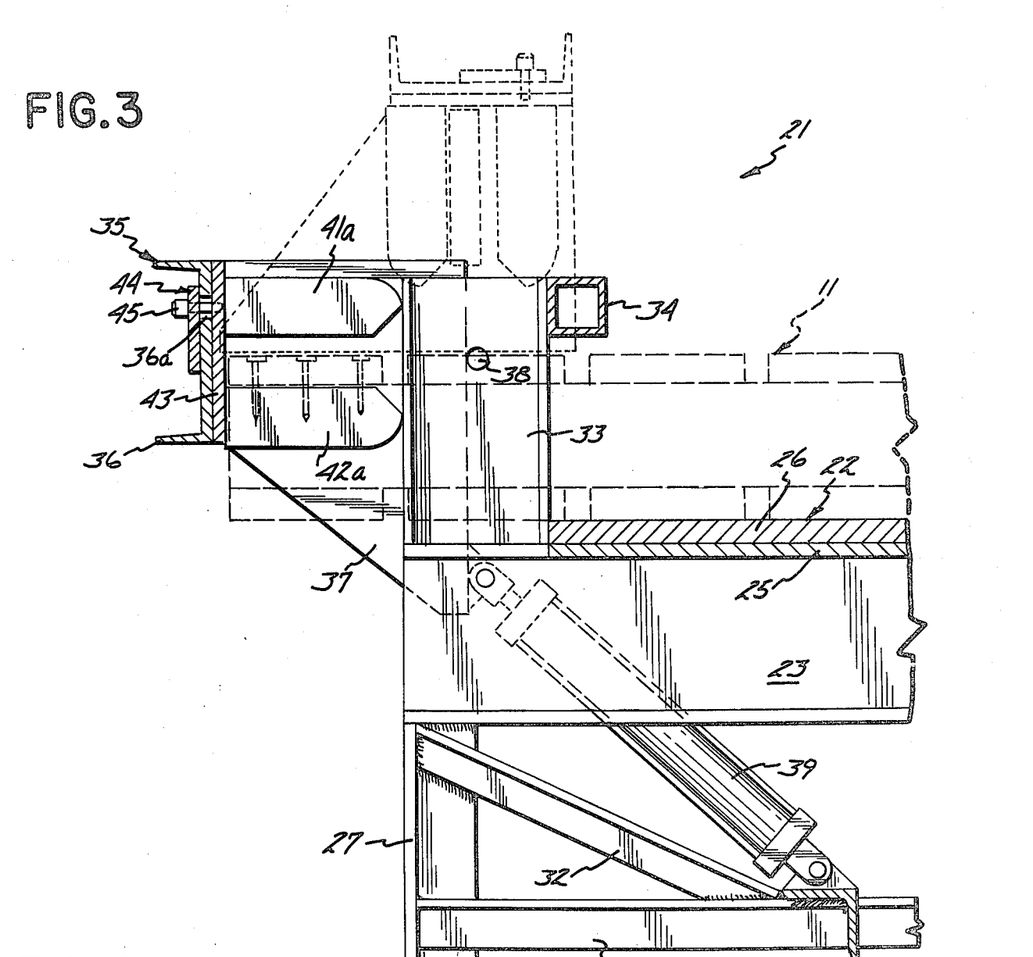
FIG. 3 is an enlarged fragmentary side view of the apparatus, showing in particularity movement of the slat receiving member between a position of initial engagement with the slat and a position in which the slat is removed.

Apparatus for disassembling a pallet 11 and which embodies the invention is referred to generally by the numeral 21 in FIGS. 1, 3 and 5. Apparatus 21 comprises a pallet supporting table bearing the general reference numeral 22, which is formed from a pair of opposed, channel beams 23 that are held in parallel spaced relation by a plurality of cross members 24. A rectangular steel plate 25 is welded to the top of cross members 24 and to the inner edges of beams 23. The thickness of plate 25 is such that it defines a support plane with the upper edges of channel beams 23, and a rectangular composite board 26 is secured thereto to define a work surface.

Table 22 further comprises four corner legs 27 that are secured to the channel beams 23, with side and end struts 28, 29 welded between the legs 27.

A cross brace 31 formed from a length of angle iron is welded to the side struts 28 with its ends projecting laterally outward for a purpose to be described below. As shown in FIG. 3, a diagonal brace 32 is welded between the side strut 28 and upper end of leg 27 to provide additional support during the pallet disassembling function.

With reference to FIGS. 1 and 3, a pair of stub members 33 of channel cross section are welded to the rear upper edge of the channel beams 23, projecting upward in opposed relation. A horizontal stop member 34 formed from square tubular steel stock is welded to the front upper edge of the stub members 33. As best shown in FIG. 3, the horizontal stop member 34 is parallel to the work surface of board 26, and is spaced vertically therefrom an amount permitting a pallet 11 to slide on the work surface under the stop member 34. Stop member 34 can be mounted for vertical adjustment relative to the work surface to accommodate pallets of greater height.

With continued reference to FIGS. 1 and 3, a pivotally movable slat removing assembly is represented generally by the numeral 35. Assembly 35 comprises a longitudinal carrier beam 35 formed from a length of channel steel. Carrier beam 36 has a length which is greater than the width of table 22, so that its ends project laterally beyond the table 22. Secured to the front face of beam 36 at each end is a pivot member 37 which in the preferred embodiment is formed from rectangular tube stock. Each of the pivot members 37 projects downward from the carrier beam 36 and is diagonally trimmed with the longer edge facing forward.

A stub rod 38 of circular cross section is welded to this longer front face or edge of each pivot member 37, projecting laterally inward. The stub rods 38 are coaxially disposed.

With continued reference to FIGS. 1 and 3 and additional reference to FIG. 5, a bore is formed in each of the stub members 33 to receive the stub rods 38 to permit pivotal movement of the slat receiving assembly 35. This pivotal movement is effected by a pair of hydraulic actuators 39, which are pivotally mounted between the laterally projecting end of cross brace 31 and the lower face or edge of pivot member 37.

The slat removing function is accomplished with several pairs of slat removing fingers which project forwardly from the front face of carrier beam 36. The preferred embodiment includes six pairs of fingers arranged in three groups of two pairs each. The middle group has upper fingers bearing the numeral 41a and lower fingers bearing the numeral 42a. Each of the side groups includes upper fingers 41b and lower fingers 42b.

Each of the finger pairs comprises an upper member 41a and 41b and a lower member 42a or 42b. As best shown in FIG. 3, the upper and lower finger members are spaced apart an amount which permits one of the slats 14 to be spaced horizontally therebetween. As shown in FIG. 5, the finger pairs in each of the groups are laterally spaced an amount sufficient to receive one of the stringers 12, 13 therebetween. The finger pair groups themselves are spaced apart a distance corresponding to the spacing between stringers 12, 13.

With reference to FIG. 1, the fingers 41a, 42a of the middle group are secured directly to the front face of carrier beam 36, as by welding. The fingers 41a, 42a are centered in this fixed position to receive the center stringer 13 of the pallet 11. Although pallets may vary in size, they typically include a center stringer, and the fingers 41a, 42a need not be adjustable.

The side groups of finger pairs 41b, 42b are, however, adjustable to enable the apparatus 21 to function for pallets of greater and lesser widths. The structure permitting lateral adjustment is specifically shown in FIG. 2. The fingers 41b, 42b are welded onto a rectangular steel plate 43, which is physically separate from the carrier beam 36. The beam 36 is formed with a pair of horizontally disposed slots 36a that laterally encompass the range of desired adjustability of the finger pairs 41b, 42b. The finger adjusting structure further comprises a backing plate 44 formed with a laterally extending ridge 44a of rectangular cross section that is sized for insertion and sliding movement within the slot 36a. An adjustment bolt 45 extends through a bore 44b in the backing plate 44, the slot 36a and into a threaded socket in the backside of plate 43 (FIG. 3).

Figure 2:
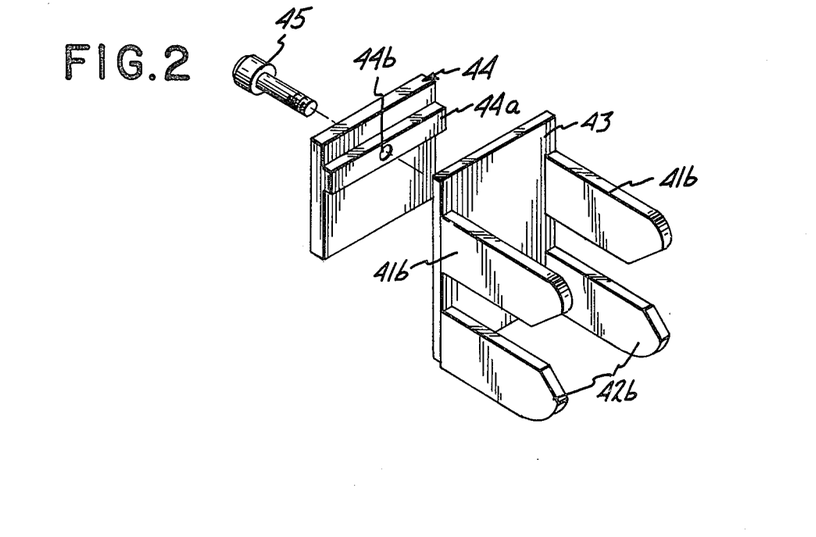
FIG. 2 is an enlarged exploded perspective view of a slat receiving member of the apparatus.

With the adjustment bolt 45 loosened, the plates 43, 44 are laterally adjustable to a desired position, and tightening of the bolt 45 holds the assembly, including fingers 41b, 42b in this operating position.

In the preferred embodiment, each of the fingers 41a, 41b, 42a, 42b is formed from plate steel and butt welded to the associated carrier in a vertically oriented position so that the forces generated during disassembly are distributed over the width of the finger (its vertical dimension) rather than its thickness. As shown in FIG. 2, the leading edge of each of the fingers adjacent the slat receiving slot is beveled to define guiding surfaces that converge toward the slot, so that the slats are properly guided even if warped or broken.

FIG. 3 shows one of the pallets 11 inserted into the slat removing position of the apparatus 21. The actuator is constructed and connected to pivotally move the slat removing assembly 35 between a first position in which the finger pairs are horizontally disposed (full lines) and a slat removal position in which the fingers are vertically oriented (phantom lines). In the horizontal position, it will be observed that the upper fingers (e.g., see FIG. 4b of FIG. 3) are at a level corresponding to that of the transverse stop bar 34. Accordingly, the upper fingers 41a, 41b and the stop bar 34 are above the top surface of pallet 11.

The lower fingers (e.g., see Finger 42b in FIG. 3) are spaced relative to the work surface so that the leading slat 14 on the pallet top is positioned over the lower fingers; i.e., between the upper and lower fingers.

Operation of the actuators 39 causes them to extend, imparting pivotal movement to the pivot members 37 about the axis defined by stub rods 38. In so doing, the finger pairs are moved from the slat receiving position to the slat removing position. In this regard, it will be noted that the finger pairs are spaced from the axis so that movement of the fingers and slat is arcuate. Thus, the slat 14 is lifted from the upper edge of the stringers 12, 13 (see FIG. 4), and not twisted.

As the engaged slat 14 is lifted, the entire pallet 11 follows until it engages the transverse stop bar 34. From this point, the slat 14 is physically separated from the stringers 12, 13, and elevated to the vertical position shown in phantom in FIG. 3. In this position, the slat 14 is released by gravity and may be removed. The pallet 11 is then removed from the apparatus 21, and the slat removing assembly 35 is returned to the slat receiving position by retraction of the actuators 39.

The hydraulic circuit is simple and conventional, comprising supply and return lines to each of the actuators 39, a source of hydraulic fluid under pressure (e.g., an oil reservoir and hydraulic pump) and a two-way hydraulic control valve that extends the actuators 39 in a first position and causes them to retract in a second position.

Figures 6, 7:
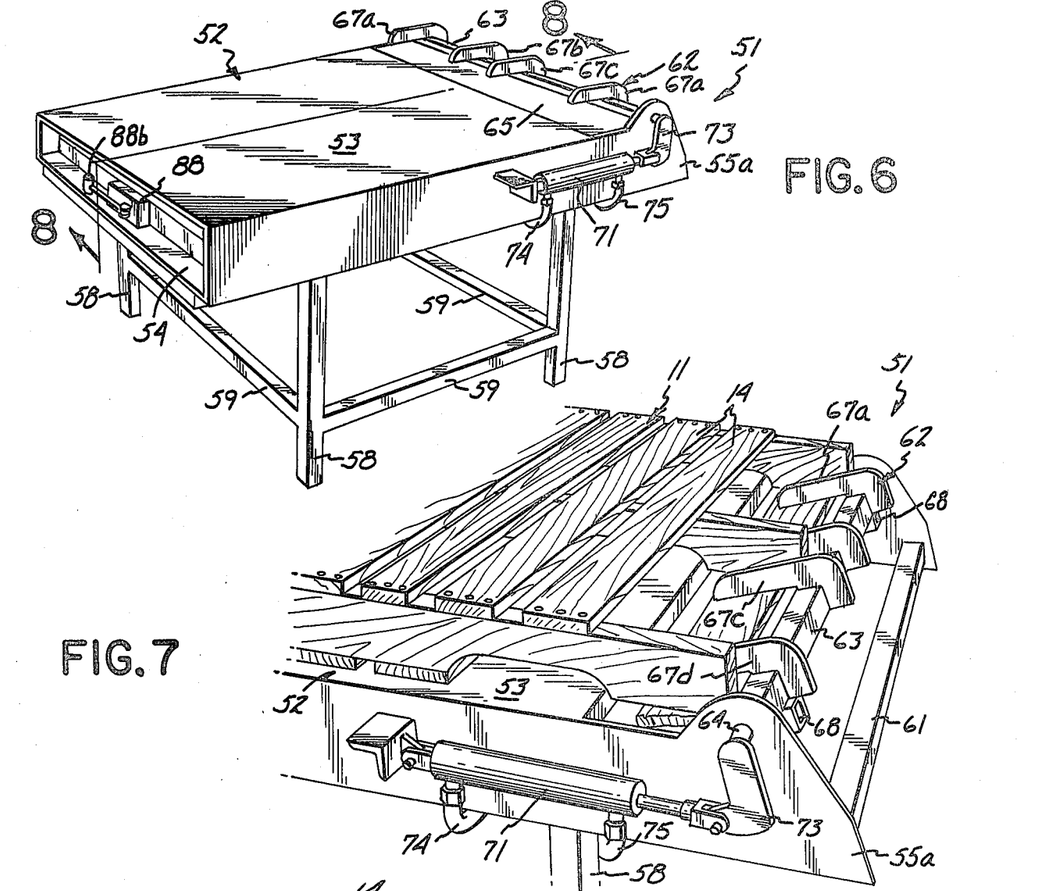
FIG. 6 is a perspective view of an alternative embodiment of the pallet disassembling apparatus.
FIG. 7 is an enlarged fragmentary perspective view of the apparatus of FIG. 6, showing a pallet in place and partially disassembled.
Figure 8:
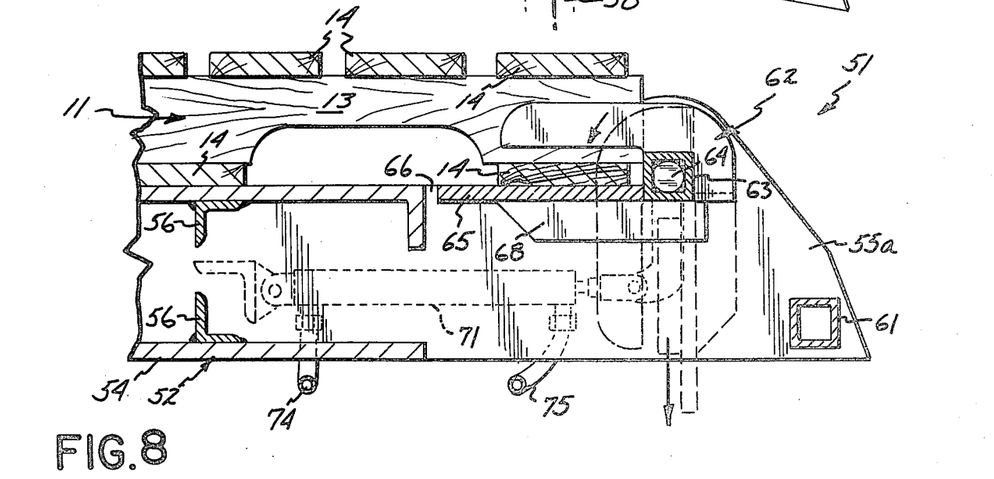
FIG. 8 is an enlarged fragmentary sectional view of the apparatus taken along the line 8—8 of FIG. 6.

An alternative embodiment of the pallet disassembling apparatus is represented generally by the numeral 51 in FIGS. 6–8. Table 52 includes a planar top 53 and bottom 54 with flat longitudinal sides 55 together defining a hollow housing of rectangular cross section. In the preferred embodiment, the members 53–55 are formed from steel plates.

A plurality of cross braces 56 (FIG. 8) are welded to the inner surfaces of the top 53 and bottom 54 for reinforcement.

The operator's end of the table 52 is recessed to accommodate a hydraulic control valve 88, which is mounted to the cross bracing 56.

Four legs 58 with interconnected cross bracing 59 supports the table 52 with the work surface of planar top 53 at a desired working level.

The sides 55 project rearwardly beyond the top 53 and bottom 54 into an extension 55a. Each of these extensions 55a projects above the plane of the table work surface to serve a carrying function for the slat removing assembly, as will be described below. A square tubular cross brace 61 is welded between the inner faces of side extensions 55a at a rearward point thereof, as shown in FIGS. 7 and 8. The side profile of each of the side extensions 55a is irregular in shape, being rounded at the top of projecting edge and angling rearwardly and downwardly to a point proximate the weldment of the cross brace 61.

A pivotally movable slat removing assembly is represented generally by the numeral 62 in FIGS. 6–8. Assembly 62 comprises a pivot bar 63 of square, tubular cross section having a length slightly less than the inside dimension between side extensions 55a. A stub rod 64 is welded into each end of the pivot bar 63, projecting longitudinally beyond. The stub rods 64 are coaxially disposed, and each is journaled in the upper rounded projection in the associated side extension 55a.

A longitudinal plate 65 is secured along the lower edge of one side or face of the square pivot bar 63 (see FIG. 8), and projects forwardly therefrom. With the pivot bar 63 rotated to the position shown in FIG. 8, the longitudinal plate 65 lies in the same plane as the top 53. The width of plate 65 is chosen to define a small gap 66 with the adjacent edge of the top 53 for clearance purposes. The length of plate 65 corresponds to the length of pivot bar 63; i.e., it occupies substantially all of the space between the side extensions 55a.

Longitudinal plate 65 is provided under-support by a pair of stub braces 68 which are disposed below the pivot bar 63 and plate 65, and commonly welded to both.

Four slat removing fingers 67a–67d are secured to the pivot bar 63 and project fowardly therefrom. The finger 67c shown in FIG. 8 is typical in size and construction, being formed from a steel plate and having a generally L-shaped configuration. The inside corner of the "L" is welded to the pivot bar 63, with the shorter leg of the "L" secured to the backside of the pivot bar 63 and the longer leg secured to the top. With the pivot bar 63 in the position shown in FIG. 8, the longer leg of the finger 67c projects horizontally forward in cantilever fashion with its straight lower edge disposed in parallel relation to the top surface of longitudinal plate 65. The lower edge of each of the fingers 67a–67d is spaced from the plate 65 an amount greater than the thickness of a slat 14, as best shown in FIG. 8. Thus, the end slats 14 on both the top and bottom of the pallet 11 may be received in the space between the plate 65 and longitudinal fingers 67a–67d.

The fingers 67a–67d are welded to the pivot bar 63 as shown in FIGS. 6 and 7. The lateral spacing is such that the fingers 67a and 67d are disposed laterally inward and adjacent of the outboard stringers 12 of pallet 11. The fingers 67b–67c are centrally positioned with one on each side of the central stringer 13 of pallet 11. The fingers 67a–67d could be adjustably mounted on the pivot bar 63 to accommodate pallets 11 of variable width.

Pivotal movement of the slat removing assembly 62 is effected by a pair of hydraulic actuators 71 mounted on opposite sides of the table 52. Each of the actuators 71 has one end pivotally mounted to an angle bracket 72 which is welded to and projects transversely from the side 55. The opposite end of the actuator 71 is pivotally connected to a bell crank 73. Hydraulic fluid is supplied under pressure to the actuator 71 by hydraulic lines 74, 75.

With the actuator 71 in the normal or retracted position (FIGS. 6 and 8), the longitudinal plate 65 is horizontally disposed and coplanar with the working surface of table top 53. In this position, the pallet 11 may be moved by the operator into the centered position shown in FIGS. 7 and 8. The application of hydraulic fluid to the actuators 71 at this time causes them to extend, rotating the plate 65 and fingers 67a–67d from the slat receiving position (full line, FIG. 8) 90° downward to the slat removing position (phantom lines, FIG. 8). In so doing, the pallet 11 is retained by the work surface of table top 53, while the fingers 67a–67d tear the slat 11 away from the stringers 12–13. Because of the rearward overhang of the sides 55a and slat removing assembly 62, the removed slat simply falls to the floor or into a collecting bin, remote from the operator and out of the way.

Figure 9:
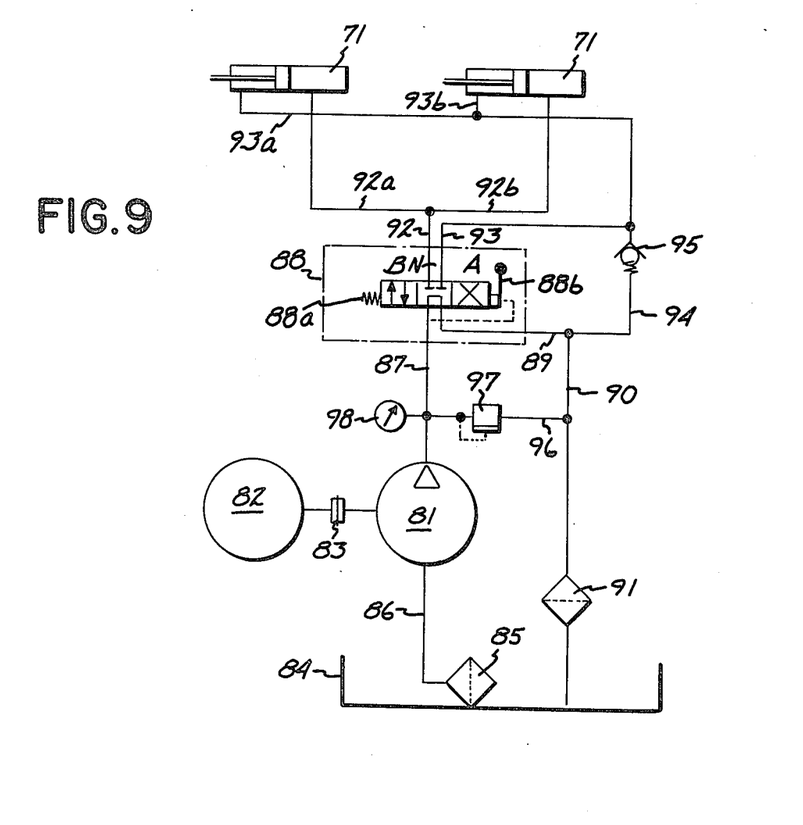
FIG. 9 is a schematic representation of the hydraulic control circuit for the apparatus of FIG. 6.

FIG. 9 is a schematic representation of the hydraulic control circuit for apparatus 51. The control circuit comprises a hydaulic pump 81 driven by an electric motor 82 through a coupler 83. During operation of the apparatus, motor 82 operates pump 81 continuously.

Pump 81 receives hydraulic fluid from a reservoir 84 through a strainer 85 and inlet line 86. A hydraulic line 87 leads from the outlet of pump 81 to the inlet of a control valve 88. A return line 89 leads from control valve 88 to a primary return line 90 that is connected to reservoir 84 through a filter 91.

Control valve 88 includes two work ports to which hydraulic lines 92, 93 are respectively connected. Hydraulic line 92 divides into lines 92a, 92b which are respectively connected to the expansion side of the hydraulic cylinders 71. Hydraulic line 93 similarly divides into lines 93a, 93b which are respectively connected to the retraction side of cylinders 71.

A line 94 including a check valve 95 connects hydraulic line 93 with primary return line 90 for a purpose described below.

A relief line 96 including a pressure responsive relief valve 97 interconnects the pump outlet line 87 with the primary return 90. In the preferred embodiment, the relief valve 97 is set to establish a bypass from the pump outlet line 87 to the primary return line 90 if pump outlet pressure reaches 1500 psi.

A gauge 98 senses and displays pump outlet pressure.

Control valve 88 is a three position valve, defining a neutral position N, a "ready" position A, and a power position B. Control valve 88 is normally urged to the neutral position N by a spring 88a. A handle 88b is manually used to move the control valve 88 to the A and B positions. A pressure responsive line 88c transmits operating pressure to a valve actuating device as described below.

In the neutral position N, the control valve 88 establishes a direct connection between the hydraulic lines 87 and 89, and hydraulic fluid runs a continuous loop from the reservoir 84 to the pump 81 and back to the reservoir 84.

When the operator wishes to use the apparatus 51, the control valve 88 is moved with handle 88b to the "ready" position A. Due to the placement of control valve 88 within the table 52, this is easily done with the operator's hand or with his knee if his hands are occupied at the time.

In the A position, hydraulic fluid is pumped under pressure from the line 87 through the valve 88 to the line 93 and lines 93a, 93b, where it serves to retract the hydraulic cylinder 71 or insure that they are in a retracted position. As pointed out above, with the actuator 71 in a retracted position, the longitudinal plate 65 is horizontally disposed in coplanar relation with the working surface of the table top 53, and the pallet 11 is properly supported on the table surface.

To the extent that the hydraulic cylinders 71 are forced to retract in this mode, the hydraulic fluid in the respective expansion chambers returns through the lines 92a, 92b and 92 through the valve 88 to return line 89 and primary return line 90 to reservoir 84.

It is not necessary to maintain full hydraulic pressure on the retracted hydraulic cylinders 71 to keep the plate 65 in a horizontal position. The check valve 95 determines the operating hydraulic pressure on the hydraulic cylinders 71 with the valve 88 in the A position. In other words, when the cylinders 71 are fully retracted, pressure in the lines 93, 93a and 93b builds up until the check valve 95 permits fluid to pass through the line 94 back to the primary return 90. In the preferred embodiment, the check valve 95 is set to relieve pressure at 65 psi.

With the hydraulic control circuit in the "ready" position A, the operator places the pallet 11 into the position shown in FIG. 8, with the stringers 12, 13 abutting the pivot bar 63. The operator now pulls on the handle 88b until the control valve 88 reaches the "power" or B position. In this position, hydraulic fluid from the pump 81 is transmitted from the line 87 to the lines 92 and 92a, 92b to the expansion side of the hydraulic cylinders 71, causing them to extend. As described above, this causes the fingers 67a–67d to swing downward into engagement with the leading bottom slat 14, removing it from the stringers 12, 13. This initial movement is shown in FIG. 7, and the completed movement is shown by the phantom lines of FIG. 8. In the full removal position, the slat 14 is pulled free from the pallet 11 and dropped by gravity to the floor or into a collecting bin.

As the hydraulic cylinders 71 extend, hydraulic fluid leaves the respective retraction chambers and flows through the hydraulic lines 93a, 93b and 93, through the control valve 88, and through the return lines 89, 90 to the reservoir 84.

When the hydraulic cylinders 71 reach their fully extended position, pressure in the hydraulic lines 87, 92, 92a, 92b increases under the static load. This pressure is also transmitted through the line 88c to the pressure responsive device within control valve 88. When this operating pressure reaches a predetermined maximum, the control valve 88 moves back to the neutral position N, where it remains until further movement by the operator. In the preferred embodiment, this maximum limit pressure is 1200 psi.

The cycle begins again with the operator's movement of the control valve 88 to the "ready" position A.

What is claimed is:

1. Apparatus for disassembling a wooden pallet having a plurality of longitudinal stringers and a plurality of transversely secured slats defining top and bottom planar support surfaces, the apparatus comprising:
   (a) a table defining a support surface for a pallet;
   (b) slat removing means comprising
      (i) frame means carried by the table about a predetermined fixed axis of rotation and pivotally movable through approximately 90° from a first position to a second position;
      (ii) means carried by the frame means defining a slot corresponding generally in size to one of the slats of the pallet;
      (iii) the slot being disposed in general alignment with the support surface with the frame means in said first position so that it receives one of the end slots of the pallet;
      (iv) the slot defining means being constructed to remove the slot from the stringers when the frame means moves from the first position to the second position;
   (c) actuating means for moving the frame means between the first and second positions;
   (d) and means for retaining the pallet as the frame means is moved by the actuating means from the first position to the second position.

2. The apparatus defined by claim 1, wherein the support surface is horizontally disposed and arranged so that one of the top and bottom surfaces of the pallet is received thereon.

3. The apparatus defined by claim 2, wherein:
(a) the frame means of the slat removing means is constructed and arranged to pivotally move upward from the support surface;
(b) and the retaining means comprises a horizontal stop bar carried by the table in overlying relation to the support surface, the stop bar being spaced above the support surface an amount that permits the pallet to slide thereunder.

4. The apparatus defined by claim 3, wherein:
(a) the frame means of the slat removing means comprises a horizontally disposed, longitudinal carrier beam;
(b) and the slot defining means comprises a plurality of finger members secured to the beam in pairs and projecting in cantilevered fashion therefrom, the finger members of each pair being spaced apart a distance greater than the thickness of a pallet slat.

5. The apparatus defined by claim 4, wherein:
(a) the slat removing means is disposed along the rear edge of the table;
(b) said finger members project horizontally forward with the frame means in the first position;
(c) and the axis about which the frame means pivots is horizontally disposed transversely of the support surface and forward of said finger members;
(d) whereby the finger members point downward with the frame means in said second position.

6. The apparatus defined by claim 4, wherein:
(a) the pallet comprises first and second side stringers and a central stringer;
(b) and the finger members are arranged in two side groups and one central group respectively disposed to receive the three stringers.

7. The apparatus defined by claim 6, wherein the finger members of the two side groups are laterally adjustable to accommodate pallets of variable width.

8. The apparatus defined by claim 6, wherein each finger member group comprises two pairs of finger members laterally spaced apart a distance greater than the thickness of a stringer.

9. The apparatus defined by claim 4, wherein:
(a) the frame means of the slat removing means further comprises
(i) a pivot member secured to each end of the carrier beam;
(ii) a pair of colinearly disposed pivot pins respectively secured to the pivot members, each pivot pin being journaled in the table;
(b) and the actuating means comprises a pair of hydraulic actuators each of which is pivotally mounted to the table and to one of the pivot members.

10. The apparatus defined by claim 9, wherein the pivotal connection of each hydraulic actuator to the pivot member is below said pivot axis with the frame means in said first position.

11. The apparatus defined by claim 9, wherein the table comprises:
(a) first and second upstanding supports projecting upwardly from the support surface in opposed relation from opposite rearward points of the table sides;
(b) said pivot pins being respectively journaled in the first and second upstanding supports.

12. The apparatus defined by claim 1, wherein the actuating means comprises at least one hydraulic actuator operably connected between the table and the frame means.

13. The apparatus defined by claim 2, wherein the frame means of the slat removing means is constructed and arranged to pivotally move downward from the support surface, said retaining means comprising said support surface.

14. The apparatus defined by claim 1, wherein said slot opens toward and is in substantial alignment with the fixed axis with the frame means in both of said first and second positions.

15. Apparatus for disassembling a wooden pallet haviing a plurality of longitudinal stringers and a plurality of transversely secured slats defining top and bottom planar support surfaces, the apparatus comprising:
(a) a table defining a support surface for a pallet, the support surface being horizontally disposed and arranged so that one of the top and bottom surfaces of the pallet is received thereon;
(b) slat removing means pivotally carried by the table and disposed relative to the support surface so that in a first position it receives one of the end slats of the pallet;
(c) the slat removing means being movable arcuately downward from the support surface between said first position and a second position in which said slat is removed from the stringers;
(d) actuating means for moving the slat removing means between the first and second positions;
(e) said support surface being disposed to retain the pallet as the slat removing means is moved by the actuating means from the first position to the second position.

16. The apparatus defined by claim 15, wherein the slat removing means comprises:
(a) a horizontal, longitudinal carrier beam disposed rearwardly of said support surface;
(b) a plate member secured to the carrier beam, the plate member projecting forwardly of the carrier beam and substantially disposed in the plane of the support surface with the slat receiving means in said first position;
(c) and a plurality of finger members secured to the beam and projecting in cantilevered fashion therefrom, the finger members being spaced from the plate member a distance greater than the thickness of a pallet slat.

17. The apparatus defined by claim 16, wherein:
(a) the table comprises spaced, parallel sides connected by a top that defines the support surface, the sides extending rearwardly beyond the top;
(b) and the slat receiving means is disposed between the sides rearwardly of the top.

18. The apparatus defined by claim 17, wherein the longitudinal carrier beam is journaled between the sides, and the plate member is rectangular in shape, having a length that approximates the distance between table sides and a width that approximates the distance between the carrier beam and rearward edge of the top.

19. The apparatus defined by claim 18, wherein:
(a) the longitudinal carrier beam comprises a pivot rod projecting axially from each end, the rod ends being journaled in the respective table sides;
(b) a bell crank is secured to the pivot rod;

(c) and the actuating means comprises hydraulic actuator means pivotally mounted between the table and the bell crank.

20. The apparatus defined by claim 19, wherein the hydraulic actuator means is carried by one of the table sides, and its pivotal connection to the bell crank is below the pivot axis of the carrier beam with the slat removing means in the first position.

21. The apparatus defined by claim 18, wherein:
    (a) the longitudinal carrier beam comprises a pivot rod projecting axially from each end, each pivot rod end extending laterally outward of the associated table side and journaled therein;
    (b) a bell crank is secured to each pivot rod outward of the table side;
    (c) and the actuator means comprises first and second hydraulic actuators each of which is pivotally connected between the table and one of the bell cranks.

22. The apparatus defined by claim 16, wherein the finger members and plate member point substantially vertically downward in the second position, whereby a removed slat may drop from the apparatus.

23. The apparatus defined by claim 16, wherein:
    (a) the pallet comprises first and second side stringers and a central stringer;
    (b) and the finger members are disposed to lie adjacent the stringers of a pallet in said first position.

24. The apparatus defined by claim 16, wherein the actuating means comprises hydraulic circuit means including hydraulic actuator means operably connected between the table and slat removing means.

25. The apparatus defined by claim 24, wherein the hydraulic circuit means comprises hydraulic pumping means and control valve means connected between the hydraulic pumping means and hydraulic actuator means, the control valve means operable in a first mode to actuate the hydraulic means up to a first pressure and move the slat removing means to and maintain it in said first position, and operable in a second mode to actuate the hydraulic actuator means up to a second pressure and move the slat removing means to the second position.

26. The apparatus defined by claim 25, wherein the control valve means is operable in a third neutral mode in which the hydraulic actuator means is isolated from the hydraulic pumping means.

27. The apparatus defined by claim 26, wherein the control valve means is manually movable through first, second and third positions corresponding to said first, second and third operation modes, and further comprising pressure responsive means for moving the control valve means from the second position to the third position when said pressure within the hydraulic actuator means reaches the second pressure.

* * * * *